US012615356B2

(12) United States Patent
de Jong et al.

(10) Patent No.: US 12,615,356 B2
(45) Date of Patent: Apr. 28, 2026

(54) AUTOSTEREOSCOPIC DISPLAY SYSTEM COMPRISING A PLURALITY OF AUTOSTEREOSCOPIC DISPLAY DEVICES

(71) Applicant: Dimenco Holding B.V., Veldhoven (NL)

(72) Inventors: Pieter Wilhelmus Theodorus de Jong, Hertogenbosch (NL); Silvino José Antuña Presa, Veldhoven (NL); Jurjen Caarls, Eindhoven (NL); Kevin van der Pol, Eindhoven (NL); Charles Jan Pieter van Dueren den Hollander, Veldhoven (NL)

(73) Assignee: Dimenco Holding B.V., Veldhoven (NL)

( * ) Notice: Subject to any disclaimer, the term of this patent is extended or adjusted under 35 U.S.C. 154(b) by 0 days.

(21) Appl. No.: 18/877,633

(22) PCT Filed: Jun. 25, 2023

(86) PCT No.: PCT/NL2023/050349
§ 371 (c)(1),
(2) Date: Dec. 20, 2024

(87) PCT Pub. No.: WO2023/249491
PCT Pub. Date: Dec. 28, 2023

(65) Prior Publication Data
US 2025/0373775 A1     Dec. 4, 2025

(30) Foreign Application Priority Data
Jun. 25, 2022     (NL) ...................................... 2032281

(51) Int. Cl.
*H04N 13/279*     (2018.01)
*G02B 27/00*     (2006.01)
(Continued)

(52) U.S. Cl.
CPC ........... *H04N 13/279* (2018.05); *G06F 3/013* (2013.01); *H04N 13/302* (2018.05);
(Continued)

(58) Field of Classification Search
CPC .. H04N 13/279; H04N 13/302; H04N 13/351; H04N 13/368; H04N 13/398;
(Continued)

(56) References Cited

U.S. PATENT DOCUMENTS 8,248,462 B2 *   8/2012   Peterka .............. G02B 27/0093
                                                              348/54
8,633,972 B2 *   1/2014   de la Barré .......... H04N 13/302
                                                              348/42
(Continued)

FOREIGN PATENT DOCUMENTS

WO     WO-2023249491 A1    12/2023

OTHER PUBLICATIONS

"International Application Serial No. PCT/NL2023/050349, International Search Report mailed Aug. 17, 2023", 3 pgs.
(Continued)

*Primary Examiner* — Douglas Wilson
(74) *Attorney, Agent, or Firm* — Schwegman, Lundberg & Woessner, P.A.

(57)     ABSTRACT

The invention relates to an autostereoscopic display system configured to display a single virtual 3D-environment on at least two autostereoscopic display devices to one or more viewers, wherein each of the autostereoscopic display devices defines a virtual window allowing a viewer to experience a part of the virtual 3D-environment. At least one virtual window is a movable virtual window that is movable within the virtual 3D-environment by moving, in the real world, the autostereoscopic display device that defines the movable virtual window. In this way, the system of the
(Continued)

invention allows a viewer to experience the part of the virtual 3D-environment through a movable virtual window from a perspective that constantly corresponds to the actual position of the eyes of the viewer relative to the virtual 3D-environment.

15 Claims, 2 Drawing Sheets

(51) Int. Cl.

| | | |
|---|---|---|
| *G02B 30/26* | (2020.01) | |
| *G06F 3/01* | (2006.01) | |
| *G09G 5/14* | (2006.01) | |
| *H04N 13/302* | (2018.01) | |
| *H04N 13/351* | (2018.01) | |
| *H04N 13/368* | (2018.01) | |
| *H04N 13/383* | (2018.01) | |
| *H04N 13/398* | (2018.01) | |
| *G02B 30/27* | (2020.01) | |
| *G02B 30/30* | (2020.01) | |

(52) U.S. Cl.
CPC ......... *H04N 13/351* (2018.05); *H04N 13/368* (2018.05); *H04N 13/398* (2018.05); *G02B 27/0093* (2013.01); *G02B 30/26* (2020.01); *G02B 30/27* (2020.01); *G02B 30/30* (2020.01); *G09G 5/14* (2013.01); *H04N 13/383* (2018.05)

(58) Field of Classification Search
CPC ...... H04N 13/383; G06F 3/013; G02B 30/26; G02B 30/27; G02B 30/30; G02B 27/0093; G09G 5/14
See application file for complete search history.

(56) References Cited

U.S. PATENT DOCUMENTS

| | | | | |
|---|---|---|---|---|
| 11,036,062 | B2 * | 6/2021 | Hansen | .................... G09G 3/20 |
| 11,973,926 | B2 * | 4/2024 | Perreault | .............. H04N 13/305 |
| 2006/0125917 | A1 * | 6/2006 | Cha | ...................... H04N 13/279 |
| | | | | 348/51 |
| 2008/0129819 | A1 * | 6/2008 | Mark | ................... H04N 13/275 |
| | | | | 348/E13.058 |
| 2011/0248987 | A1 * | 10/2011 | Mitchell | ................ G06T 15/20 |
| | | | | 345/419 |
| 2020/0304758 | A1 | 9/2020 | Valli | |

OTHER PUBLICATIONS

"International Application Serial No. PCT/NL2023/050349, Written Opinion mailed Aug. 17, 2023", 7 pgs.
"Taiwanese Application Serial No. 112123662, Office Action mailed Nov. 1, 2024", W English Translation, 16 pgs.

* cited by examiner

AUTOSTEREOSCOPIC DISPLAY SYSTEM COMPRISING A PLURALITY OF AUTOSTEREOSCOPIC DISPLAY DEVICES

CROSS-REFERENCE TO RELATED APPLICATION

This application is a U.S. National Stage Filing under 35 U.S.C. 371 from International Application No. PCT/NL2023/050349, filed on Jun. 25, 2023, and published as WO 2023/249491, which claims priority to Netherlands Patent Application No. 2032281, filed Jun. 25, 2022, each of which applications are incorporated herein by reference in their entirety.

FIELD OF THE INVENTION

The invention relates to an autostereoscopic display system for displaying a single virtual 3D-environment on at least two autostereoscopic display devices.

BACKGROUND

Autostereoscopic displays allow a viewer to perceive three-dimensional images of a three-dimensional environment without a dedicated eyewear device such as a head set, a head-mounted display, glasses, etc. It is in particular possible to adapt the three-dimensional images to movement of the viewer relative to the display. For example, an object in the background may become invisible to a viewer due to motion parallax, when an object on the foreground blocks the line of sight (occlusion).

This may be realized by using an eye tracking device in combination with a screen that comprises a lenticular lens or parallax barrier. This ensures that the autostereoscopic display can simultaneously direct a left eye image exclusively to a left eye of the viewer and a right eye image exclusively to a right eye of the viewer. Some parts of the resulting stereoscopic image may then appear in front of the display, while other parts may appear further away than the display ('behind' the display). The absence of any dedicated eyewear device allows a viewer to experience that he is physically present in the real world, while the autostereoscopic display forms a virtual window to another world-a truly believable virtual world that is also three-dimensional.

Such view to a virtual world may however still be perceived as limited, since the virtual window provides a view to only a part of the virtual world. Moreover, humans are characterized by their inclination to work and recreate in groups. Conventional autostereoscopic displays provide limited possibilities for experiencing a large virtual world and/or for being involved in a virtual world with peers. In other words, conventional autostereoscopic displays may still be improved with respect to the immersive experience that they can offer a viewer or viewers.

SUMMARY OF THE INVENTION

It is therefore an object of the present invention to provide an autostereoscopic display device that achieves an increased immersion for one or more persons in a virtual 3D-environment. A particular object is to provide a person with an enlarged view on a virtual 3D-environment. It is also a particular object to involve multiple persons in a virtual 3D-environment.

It has now been found that one or more of these objects can be reached by coupling a plurality of autostereoscopic display devices in a particular manner.

Accordingly, the present invention relates to an autostereoscopic display system (1) configured to display a single virtual 3D-environment (2) on at least two autostereoscopic display devices (3) to one or more viewers (4), wherein
- each of the autostereoscopic display devices (3) defines a virtual window (5) allowing a viewer (4) to experience a part of the virtual 3D-environment (2), which part is displayed on the autostereoscopic display device (3) as a stereoscopic image;
- at least one virtual window (5) is a movable virtual window (5) that is movable within the virtual 3D-environment (2) by moving the autostereoscopic display device (3) that defines the movable virtual window (5);
- at least one of the viewers (4) experiences the part of the virtual 3D-environment (2) through a movable virtual window (5) from a perspective that corresponds to the position of the eyes of the at least one viewer (4) relative to the virtual 3D-environment (2).

In a favorable embodiment, the autostereoscopic display system comprises
- at least two autostereoscopic display devices (3) wherein each autostereoscopic display device (3) comprises
  - a display element (6) for displaying a stereoscopic image to a viewer (4) of the autostereoscopic display device (3) by directing a left eye image to his left eye and a right eye image to his right eye; and
  - an eye tracker (7) for obtaining the position of the eyes of the viewer (4) relative to the autostereoscopic display device (3);
- a first means (11) for providing a virtual 3D-environment (2) which comprises at least two virtual windows (5), wherein
  - each virtual window (5) is defined by an autostereoscopic display device (3) of the system; and
  - at least one virtual window (5) is a movable virtual window (5) that is movable within the virtual 3D-environment (2) by moving the autostereoscopic display device (3) that defines the movable virtual window (5);
- a second means (12) for obtaining the position of the at least two virtual windows (5) in the virtual 3D-environment (2);
- a third means (13) for obtaining the position of the eyes of each of the one or more viewers (4) relative to the virtual 3D-environment (2); and
- a fourth means (14) for generating a stereoscopic image of the virtual 3D-environment (2) for display on each of the at least two autostereoscopic display devices (3) that is viewed by a particular viewer (4), wherein the stereoscopic image for each autostereoscopic display device (3)
  - is recorded by a virtual stereo camera (8) that is positioned at the position of the eyes of the particular viewer (4) of the autostereoscopic display device (3) relative to the virtual 3D-environment (2), as determined by the third means (13), so that it has a perspective that corresponds to the position of the eyes of the particular viewer (4) relative to the virtual 3D-environment (2); and
  - is capable of being displayed by the display element (6) of the autostereoscopic display device (3).

DETAILED DESCRIPTION OF THE INVENTION

Figure 1:
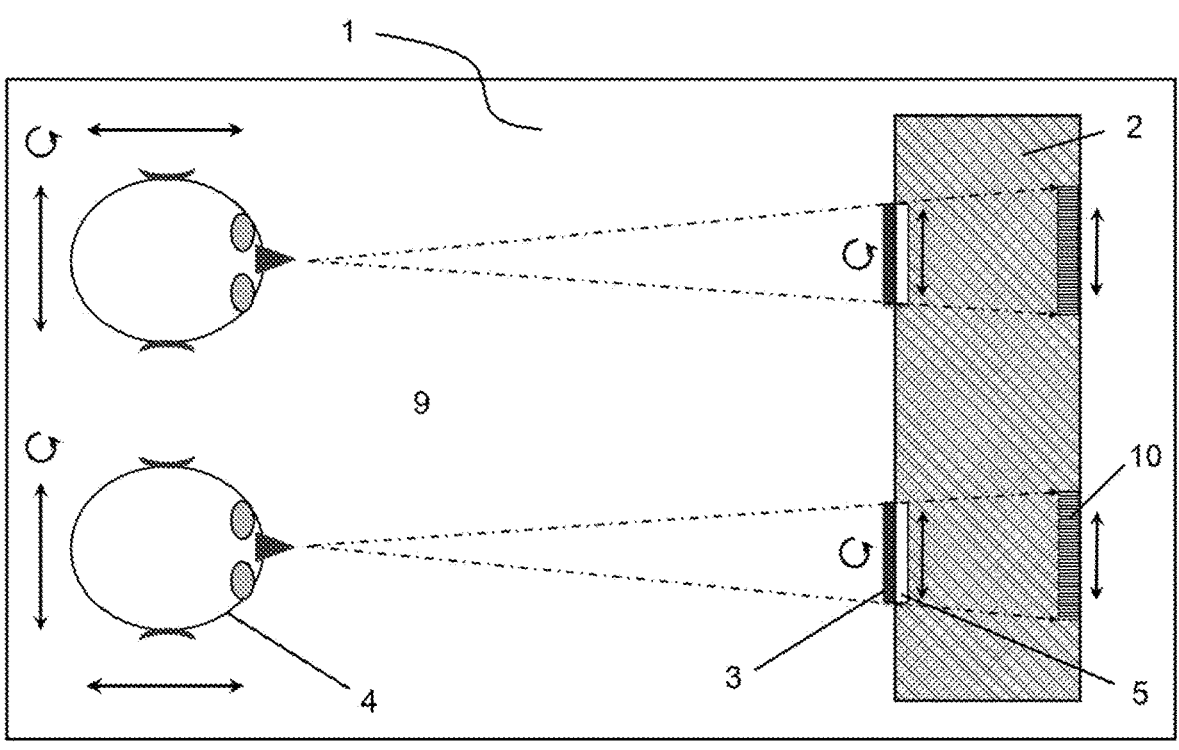
FIG. 1 displays two schematical top views of a first embodiment of the invention comprising a system of the invention and a viewer.
Figure 1:
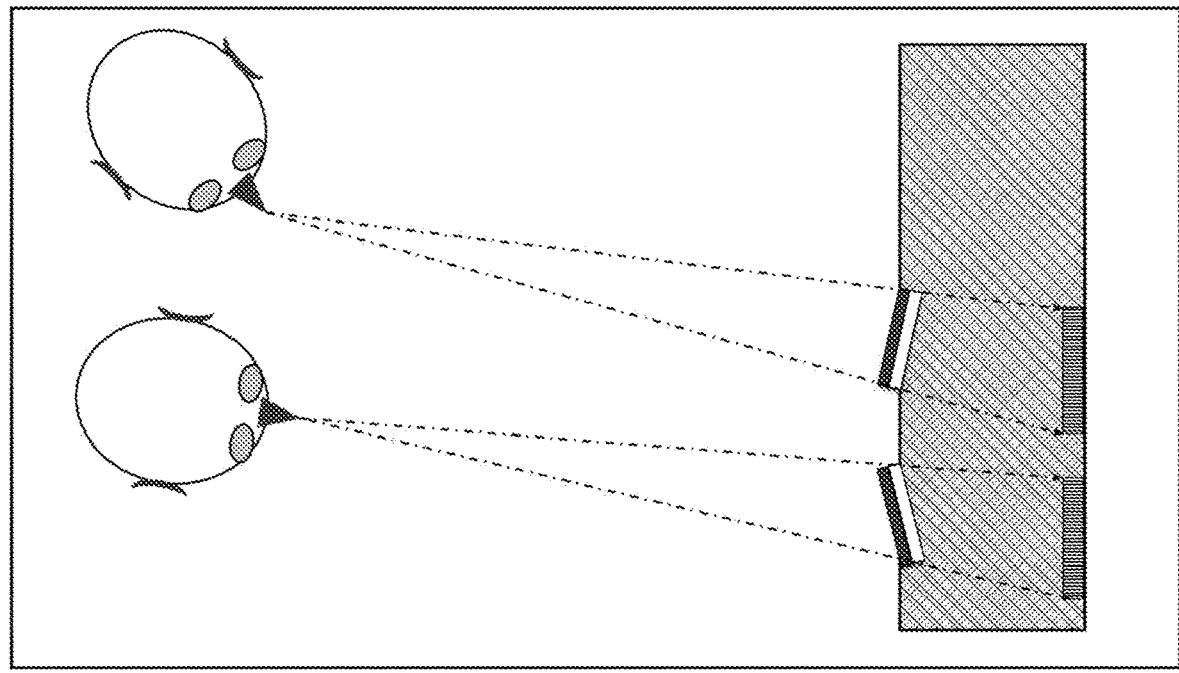

The figures do not limit the present invention to the specific embodiments disclosed therein and described in the present description. Elements in the figures are illustrated for simplicity and clarity and have not necessarily been drawn to scale, emphasis instead being placed upon clearly illustrating the principles of the invention. For example, the dimensions of some of the elements in the figures may be exaggerated relative to other elements to help improve understanding of various exemplary embodiments of the present invention. In particular, the relative dimensions of a viewer, an autostereoscopic display device, a virtual window and a virtual 3D-environment in a particular setting cannot be derived from the figures. Also, the figures provide no indication of the relative positioning of the different autostereoscopic display devices. Furthermore, the terms "first", "second", and the like herein, if any, are generally used for distinguishing between similar elements and not necessarily for describing a sequential or chronological order.

In the context of the invention, by the term 'viewer' is meant a person consuming the content that is presented to him by an autostereoscopic display system according to the present invention. The viewer in particular views (e.g. watches) an autostereoscopic display device that is present in a system of the invention, where he sees a stereoscopic image (or movie). He can switch to viewing another display device, but is in principle not able to view two devices simultaneously. Besides viewing, the viewer may also experience other sensory stimulus such as sound or haptic stimulus. For convenience, however, the person is consequently referred to as 'viewer', although it is understood that he may at the same time also be e.g. a 'listener'.

Further, a viewer is understood to be a real entity existing in the real world, such as a male or female person or animal. Throughout the text, references to the viewer will be made by male words like 'he', 'him' or 'his'. This is however only for the purpose of clarity and conciseness, and it is understood that female words like 'she', and 'her' equally apply.

Throughout the text, the term "3D" is used for the sake of conciseness. This term is meant to be equivalent to the term "three-dimensional". For example, the terms "3D-object" and "3D-environment" are meant to indicate "three-dimensional object" and "three-dimensional environment", respectively.

In the context of the invention, by the term 'virtual 3D-environment' is meant a three-dimensional environment that is artificially created and therefore does not exist in reality. It consists of data that is typically contained in a memory storage, which can be read and modified by a computing means and can be displayed on a display means. The data comprises a mapping of the virtual elements that are present in the virtual 3D-environment in the sense that at least their 3D-shape and their mutual positioning in the environment is known. This allows a realistic display of the virtual 3D-environment from different points of view. When displayed on an autostereoscopic display device, in particular on an autostereoscopic display system according to the present invention, a viewer may perceive a virtual 3D-environment as a real 3D-environment.

A virtual 3D-environment is not necessarily stationary, since it May evolve in the sense that it is subject to changes, for example due to virtual objects that move relative to other virtual objects in the virtual 3D-environment. An evolving 3D-environment may evolve due to changes that are the result of predictable events that are programmed as being part of the virtual 3D-environment; or due to changes that are the result of unpredictable events induced by a viewer, for example a viewer's reaction to an event that happens in the virtual 3D-environment.

In the context of the present invention, by an eye tracker is meant a means for the tracking the position of one or both eyes of a viewer in time. The obtained sequential positions are related to the position of the tracking system that performs the tracking, and ultimately to the position of the autostereoscopic display device.

In the context of the present invention, a virtual stereo camera is understood to have a certain position and orientation (six degrees of freedom) in the virtual 3D-environment. It produces image data representing a stereoscopic view of the virtual 3D-environment from a perspective corresponding to its particular position and orientation in the virtual 3D-environment. The virtual stereo camera has its position at the position of the eyes of the viewer, and is moved and/or re-oriented in the virtual 3D-environment upon movement of the viewer's head in the real world.

A virtual stereo camera is composed of two separate virtual cameras, in analogy with physical stereo cameras known in the art. The produced image data are left image data representing a left eye image and right image data representing a right eye image. Each of the two virtual cameras has the position of an eye of the viewer and can be moved and/or re-oriented in the virtual 3D-environment upon movement of the viewer's head in the real world. In this way, the viewer may define the position, direction and angle of view for generating the left and right image data.

The input for the two virtual cameras is for example provided by a memory that comprises a representation of the virtual 3D-environment that is to be presented to the viewer, such as locations and orientations of different elements in the virtual 3D-environment. Other properties of the different elements may also be provided by the memory, such as surface properties, mechanical behavior (e.g. to be applied when elements collide), reflection of light, etc.

Further, the representation of the virtual 3D-environment in the memory may be capable of being modified by input from the real world, such as an action of the viewer (e.g. pressing a virtual button positioned in the virtual 3D-environment or firing a virtual bullet with a real or virtual gun at an element in the virtual 3D-environment).

When the position of an object (e.g. an autostereoscopic display device or a virtual window) in an environment is concerned, then this is meant to include the orientation of the object within that environment.

A system of the invention comprises at least two autostereoscopic display devices. These have the function of displaying a single virtual 3D-environment (i.e. one and the same virtual 3D-environment) to at least one viewer, wherein each autostereoscopic display device acts as a virtual window to the virtual 3D-environment. This means that the content that is displayed on a display element of an autostereoscopic display device is in fact that part of the virtual 3D-environment that would be visible if the display element would be a real window and the virtual 3D-environment would be a real 3D-environment. A real world equivalent of this concerns a viewfinder of a camera that displays the real world (most similar would be a viewfinder that is nothing more than an opening defined by a frame lacking a lens or a display, allowing the view of a cut out of the real world).

In this way, a single viewer may perceive a virtual 3D-environment as a real 3D-environment, observable through at least two windows which he may also perceive as real (in practice he will watch only one of the screens at a time). Or, for two or more viewers, a virtual 3D-environment may be perceived as a real 3D-environment, observable through a window that each viewer may perceive as real.

Both settings require that the relative positions of the different autostereoscopic display devices are known, which is accomplished by the second means as will be further explained below. Both settings also require that the relative position of the eyes of each viewer relative to the virtual 3D-environment is known, which is accomplished by the third means as will also be further explained below.

For an autostereoscopic display device that is movable (in the sense that it can change position in a real 3D-environment), there is an additional requirement. Knowledge of its position and/or acceleration in the real 3D-environment is constantly required to account for its movement relative to the virtual 3D-environment. For example, relative movement of two movable autostereoscopic display devices alone does not provide information on the movement of each one of them relative to the virtual 3D-environment; unless at least one of them has for example a known position and/or a known acceleration in the real 3D-environment.

When the relative positions of different autostereoscopic display devices are known, it is sufficient to know for only one of them the position and/or acceleration in the real 3D-environment. This may for example be a device that is stationary in the sense that it does not move relative to the real 3D-environment during a certain viewer session.

It is noted that the wording 'one and the same virtual 3D-environment' does not necessarily mean that the different virtual windows provide a view of the same part or the same scene of the virtual 3D-environment but only from a different angle. When there is a sufficient separation of the two different scenes, then it is possible that neither of them is viewed by two viewers at the same time, when each viewer looks through his own virtual window.

Each of the virtual windows may thus well provide a view on different scenes that belong to the same virtual 3D-environment. When, for example, a virtual 3D-object moves through the virtual 3D-environment from one scene to another scene, and can then be sequentially observed through each virtual window by the viewer, then an increased immersion for a single person in a virtual 3D-environment can be achieved.

An increased immersion for two or more persons is also possible. For example, a first viewer may start an action in a first scene that is visible to him as a part of the virtual 3D-environment, wherein the action causes an effect in a second scene that is visible to a second viewer. The first viewer for example creates a virtual smoke in the first scene, which triggers a fire alarm that can be heard by both viewers. When the smoke dissipates and after some time reaches the second scene, it becomes also visible to the second viewer.

Autostereoscopic display devices are known in the art, e.g. from WO2013120785A2. Important components of an autostereoscopic display device in a system of the invention are 1) a display element for displaying a stereoscopic image to a viewer; and 2) an eye tracker for tracking the position of the eyes of the viewer relative to the autostereoscopic display device.

The eye tracker comprises means for tracking the position of the viewer's eyes relative to the autostereoscopic display device (more specifically relative to the display element). It is typically a fixed part of the autostereoscopic display device in that it has a fixed and known position relative to the display element. The obtained position data of the eyes are used by the third means to track the position of the eyes of a viewer relative to the virtual 3D-environment. As will be further elaborated below, the positions of the virtual windows in the virtual 3D-environment are also used to achieve this.

The obtained position data of the eyes may also be used to simultaneously direct a left eye image to a left eye of the viewer and a right eye image to a right eye of the viewer (important here is that a left eye image may also be directed at other areas, as long as it does not hit the right eye and vice versa). The use of eye position data is however not essential to drive an autostereoscopic display device. It is in principle also possible to realize autostereoscopic viewing without an eye tracker.

The display element comprises means for displaying a stereoscopic image to a viewer whose eyes are tracked by the eye tracker. Such display means comprise an array of pixels for producing a display output and a parallax barrier or a lenticular lens that is provided over the array to be able to direct a left image to the viewer's left eye and a right image to the viewer's right eye. The display element is driven by a processing unit, which may be present in the autostereoscopic display device. The processing unit may also be a central unit that simultaneously drives the display element of two or more of the autostereoscopic display devices of the system.

In a system of the invention, one or more of the autostereoscopic display devices may be a device that is largely stationary in the real world during its use, such as a desktop device or a wall-mounted device (for example a television, a (desktop) computer monitor or a laptop). They may however also be a portable device such as a mobile phone, a tablet or a game console, allowing a viewer to (freely) move within the real world.

The system of the invention is configured, however, to drive at least one autostereoscopic display device that is movable within a real 3D-environment. Since such movable autostereoscopic display device also defines a movable virtual window, movement within in the real world leads to a corresponding movement within in the virtual world. In the system of the invention, the movable autostereoscopic display device is driven in such manner that, during movement, a viewer's view through the virtual window has a perspective that constantly corresponds to the actual position of the viewer's eyes relative to the virtual 3D-environment. The movable autostereoscopic display device may of course also have a stationary position during a viewer session.

The number of autostereoscopic display devices in a system of the invention is in principle not limited. Usually, however, the system of the invention comprises 2-25 autostereoscopic display devices, in particular 2-10.

The number of virtual windows that is movable within the virtual 3D-environment is in principle not limited. Usually, however, the number of movable virtual windows is in the range of 1-25, in particular in the range of 2-10.

FIG. 1 displays two schematical top views of a first embodiment of the invention. It comprises an upper drawing and a bottom drawing, which differ by the positions of the two viewers (4) and the two autostereoscopic display devices (3). It displays a schematical top view of the system (1) of the invention and two viewers (4). In a real 3D-environment (9), which is represented in two-dimensional form in FIG. 1, a virtual 3D-environment (2) is drawn as a rectangular box comprising two virtual windows (5) and two virtual scenes (10). Just next to the virtual windows (5), two autostereoscopic display devices (3) are present (each virtual window (5) in practice coincides with a device (3), but for the sake of clarity their positions are minimally shifted in FIG. 1). A stereoscopic image of the virtual 3D-environment (2) is generated for each viewer (4) on the autostereoscopic display device (3) that is viewed by the viewer (4). The two viewers (4) each watch one of the two autostereoscopic display devices (3) and experience the virtual 3D-environment (2) that is displayed thereon. The position and orientation in the real 3D-environment (9) of the two viewers (4) as well as of the two autostereoscopic display devices (3) in the bottom drawing are different from those in the upper drawing. Both drawings demonstrate how the system responds to this, in that the observed scenes (10) change their position in a way that is similar to what a viewer (4) would expect when he would watch a real environment through a real window. In other words, the scene (10) that is viewed by each viewer (4) changes in agreement with the viewer's (4) position. The changes in position and orientation in both drawings of FIG. 1 are indicated by the arrows drawn next to the viewers (4), next to the autostereoscopic display devices (3) and next to the scenes (10).

Figure 2:
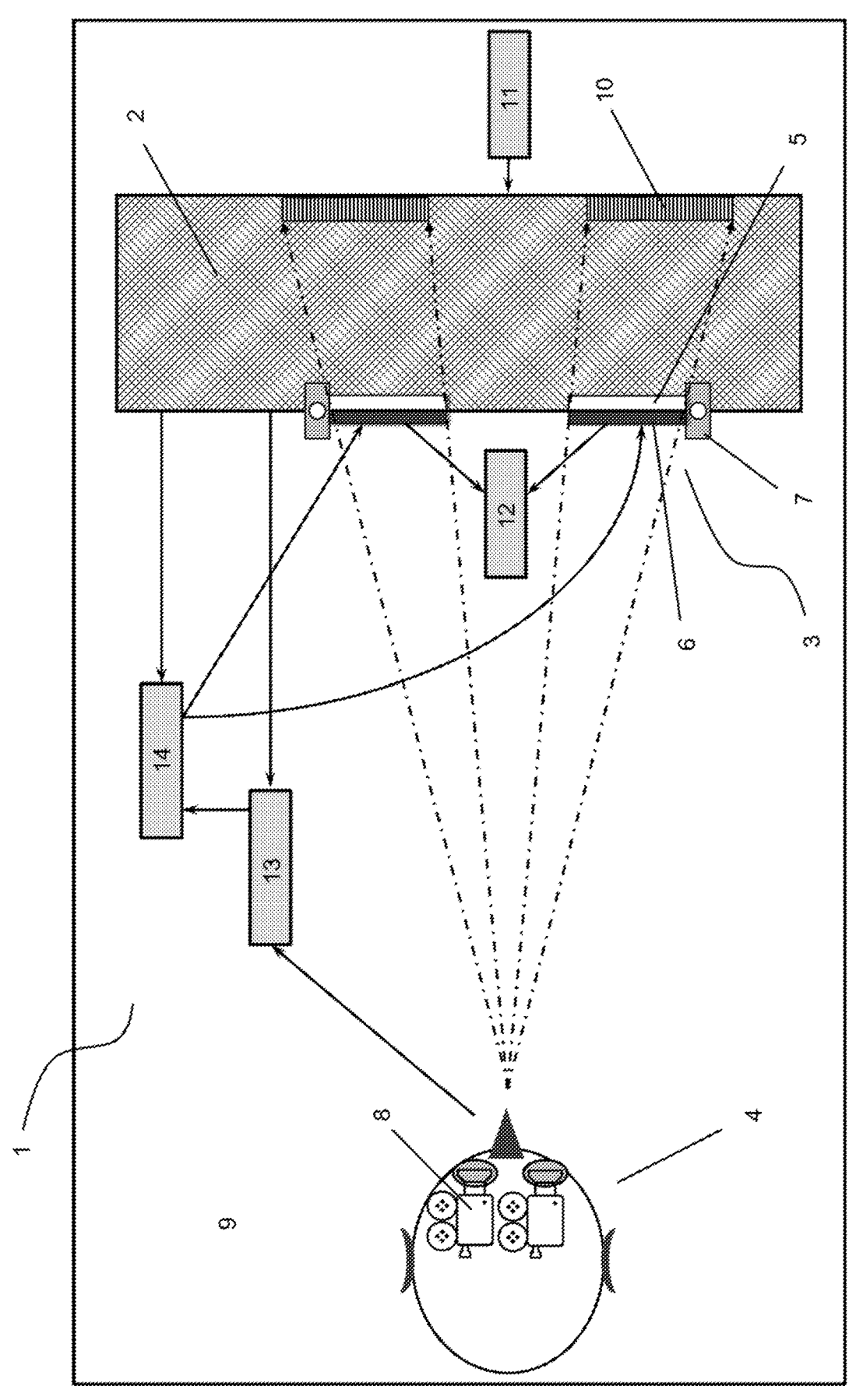
FIG. 2 displays a schematical top view of a second embodiment of the invention comprising a system of the invention and a viewer.

FIG. 2 displays a second embodiment of the invention. It displays a schematical top view of a setting comprising the system (1) of the invention and a single viewer (4). In a real 3D-environment (9), which is represented in two-dimensional form in FIG. 2, a virtual 3D-environment (2) is drawn as a rectangular box comprising two virtual windows (5) and two virtual scenes (10). The virtual 3D-environment (2) is provided by the first means (11). Just next to the virtual windows (5), two autostereoscopic display devices (3) are present (each virtual window (5) in practice coincides with a device (3), but for the sake of clarity their positions are minimally shifted in FIG. 2). Each autostereoscopic display device (3) comprises a display element (6) and an eye tracker (7). The viewer (4) looks at one of the two autostereoscopic display devices (3) at a time and experiences the virtual 3D-environment (2) that is displayed thereon. The second means (12) is configured to obtain the position of the at least two virtual windows (5) in the virtual 3D-environment (2) by using the position of the corresponding autostereoscopic display devices (3) in the real 3D-environment (9). The third means (13) is configured to obtain the position of the eyes the viewer (4) relative to the virtual 3D-environment (2). The fourth means (14) is configured to generate a stereoscopic image of the virtual 3D-environment (2) for display on the autostereoscopic display device (3) that is viewed by the viewer (4). The stereoscopic image is recorded by a virtual stereo camera (8), which is positioned at the position of the eyes of the viewer (4) of the autostereoscopic display device (3). This is the position relative to the virtual 3D-environment (2), as determined by the third means (13). Therefore, the third means (13) and the virtual 3D-environment (2) provide the input for the fourth means (14). The result is that a scene (10) is displayed to the viewer (4) with a perspective that constantly corresponds to the actual position of the eyes of the viewer (4) relative to the virtual 3D-environment (2).

For the sake of clarity, in FIGS. 1 and 2, the number of sight lines from the eyes to the virtual environment have been reduced and all emerge from one point in front of the head (rather than from each eye).

A system of the invention comprises a first means for providing a virtual 3D-environment. This first means typically comprises a computer-readable medium (such as a memory) comprising data that represent the virtual 3D-environment. It may also comprise a computer program comprising instructions to modify the virtual 3D-environment.

The data that represent the virtual 3D-environment comprise data that represent at least two virtual windows, so that at least two virtual windows become part of the virtual 3D-environment. Each of these virtual windows is defined by an autostereoscopic display device of the system. This essentially means that the display element of the autostereoscopic display device (in particular a portion that actually emits light to display an image to a viewer, e.g. a screen) coincides with the opening provided by the window. This coincidence forms a link between the virtual 3D-environment and the real 3D-environment. Any movement of an autostereoscopic display device within the real 3D-environment inherently translates into movement of the corresponding virtual window within the virtual 3D-environment. The first means takes account of this movement and provides the position of the virtual window within the virtual 3D-environment. This includes its position with respect to other elements in the virtual 3D-environment, and any change therein due to movement of the virtual window within the virtual 3D-environment.

A virtual 3D-environment that is capable of being provided by the first means comprises at least two virtual windows, of which there is at least one that is movable within the virtual 3D-environment by moving, in the real world, the autostereoscopic display device that defines the movable virtual window. The number of movable virtual windows may also be higher, for example in the range of 1-25, in particular in the range of 2-10.

Preferably, all of the autostereoscopic display devices in a system of the invention are movable devices. This typically means that all virtual windows are movable virtual windows. Although an autostereoscopic display device may stand still in practice (e.g. during a particular viewer session), it is still advantageous that it is a movable device. It is for example convenient that a viewer session can be started immediately after positioning the autostereoscopic display devices in a desired position without having to perform a calibration procedure and without having to worry about someone accidently moving the autostereoscopic display device during the viewer session. In other words, the first means may comprise means for providing a virtual 3D-environment wherein all virtual windows are movable virtual windows, i.e. virtual windows that are movable within the virtual 3D-environment.

A virtual 3D-environment that is capable of being provided by the first means may comprise at least one virtual window that is not movable within the virtual 3D-environment. In other words, the first means may comprise means for providing a virtual 3D-environment which comprises at least one virtual window that is not movable within the virtual 3D-environment. For example, when the system comprises two autostereoscopic display devices of which only one is a movable device, then the other one is not movable within the virtual 3D-environment and therefore qualifies a stationary device.

Thus, the virtual 3D-environment is provided by the first means, including the at least two virtual windows, one of which is movable. The first means does however not provide the positions of these virtual windows within the virtual 3D-environment as these positions may be subject to change induced by the viewer. Therefore, the second means is specifically directed at obtaining the position of the at least two virtual windows within the virtual 3D-environment.

The input for this is typically formed by the position of each of the at least two autostereoscopic display devices in a real 3D-environment. After all, as explained above, each virtual window is defined by an autostereoscopic display device of the system, and any movement of such autostereoscopic display device within the real 3D-environment translates into movement of the corresponding virtual window within the virtual 3D-environment.

To this end, the second means is preferably configured to make use of data representing the position and/or acceleration of the at least two autostereoscopic display devices in a real 3D-environment.

For example, the second means is configured to make use of data representing the position of a stationary autostereoscopic display device in a real 3D-environment; and data representing the position of one or more movable autostereoscopic display devices relative to the position of the stationary autostereoscopic display device.

There are multiple ways to configure the second means to achieve this. A skilled person knows in which way the positions of the different autostereoscopic display devices can be obtained for the purpose that they serve in the system. He can realize this by routine methods and without exerting any inventive effort.

For example, in the system of the invention, each autostereoscopic display may be equipped with one or more accelerometers and optionally with one or more measuring instruments selected from the group of gyroscopes and magnetometers. With this instrumentation, all relative positions and speeds of the different autostereoscopic display devices may be derived from the measured accelerations, following an initial calibration. Such calibration is for example based on determining initial relative speeds of the autostereoscopic display devices or on identifying common environmental features (a person, a body part, an object, a corner between two walls) by cameras at different autostereoscopic display devices. The latter principle is known as 'multi-camera feature correspondence', for which the camera of the eye tracker may be used or a different camera that is specifically configured for this purpose.

The principle of multi-camera feature correspondence may of course also be used to continuously track the positions of the different autostereoscopic display devices in a real 3D-environment. To this end, one or more common environmental features (a person, a body part, an object, a corner between two walls) may be identified by cameras at different autostereoscopic display devices. The position of each of the different autostereoscopic display devices is then obtainable by relating it to such common environmental features. The mutual position of the different autostereoscopic display devices can then also be derived. Since an eye tracker is already present at the autostereoscopic display devices, the eyes may serve as a common environmental feature.

The absolute positions in a real 3D-environment may also be determined by an external measuring means that is positioned at a distance from the autostereoscopic display devices and at a fixed position in the real 3D-environment (rather than by built-in equipment such as accelerometers). For example, the measuring principle of such external measuring means relies on the Doppler effect (in sound or light), on time of flight or on triangulation. To this end, the external measuring means may comprise a source of (ultra) sound and/or electromagnetic radiation, that is capable of irradiating the autostereoscopic display devices. A setting where this is realized is for example a room that is dedicated to providing viewers with a high-quality virtual reality experience. This may include the positioning of a plurality of external measuring means that are stationary and can accurately obtain the relative positions of the autostereoscopic display devices.

The autostereoscopic display device which a viewer is looking at functions as a virtual window to a part of the virtual 3D-environment behind that window, wherein this virtual 3D-environment is displayed on the display element of the autostereoscopic display device (in particular on a screen of the display element). For a correct displaying, account is taken of (1) the position of the virtual window in the virtual 3D-environment (which includes its orientation in the virtual 3D-environment); and (2) of the position of the eyes of the viewer relative to the autostereoscopic display device (and thus relative to the virtual window that coincides with the autostereoscopic display device). It is the function of the third means to combine both positions and so arrive at the position of the eyes of the viewer relative to the virtual 3D-environment. This position is important, because it is the position of a virtual stereo camera that records the images of the virtual 3D-environment—images that are subsequently displayed on the display element of the autostereoscopic display device that is viewed by the viewer. In this way, the viewer views a virtual 3D-environment that is adapted exactly to his position relative to this display element of the autostereoscopic display device, i.e. it has the correct perspective from his point of view.

Accordingly, in a system of the invention, the third means is usually configured to make use of the position of the eyes of each viewer relative to the position of an autostereoscopic display device that is viewed by a respective viewer, as obtained by the eye tracker of the autostereoscopic display device that is viewed by the respective viewer;

the position of a virtual window in the virtual 3D-environment (2) which virtual window is defined by the autostereoscopic display device that is viewed by the respective viewer, which position is the position as obtained by the second means.

The third means may obtain the position of the eyes relative to the virtual 3D-environment for one viewer, but also for multiple viewers. In fact, it provides this position for all viewers of the system, i.e. for all viewers whose eyes are in a position to be tracked by an eye tracker (when eye tracking is not yet possible or not possible anymore, a person does not qualify as a viewer).

The system of the invention is configured to display a single virtual 3D-environment to at least one viewer. Preferably, however, to at least two viewers, for example to 1-25 viewers, in particular to 1-10 viewers. Typically, the number of viewers is equal to the number of autostereoscopic display devices that are present in the system.

Given the status of the virtual 3D-environment at a certain moment, an image needs to be prepared of this virtual 3D-environment for display on each of the system's autostereoscopic display devices that is viewed by a particular viewer. This of course needs to be performed according to the specific perspective of each viewer. The fourth means fulfills this function.

First, a virtual camera is positioned at the position of each eye of a viewer of each autostereoscopic display device, as determined by the third means (an assembly of two such virtual cameras-one for each eye-therefore qualifies as a virtual stereo camera). Then, the virtual stereo camera is allowed to record a stereoscopic image of the virtual 3D-environment, thereby using data that represent the virtual 3D-environment. This recording has a perspective that constantly corresponds to the actual position of each eye of the viewer relative to the virtual 3D-environment. Further, this recording is capable of being displayed by the display element of the autostereoscopic display device for which the stereoscopic image of the virtual 3D-environment was generated.

It is an advantage of the system of the invention that it allows a viewer to experience and/or explore a virtual 3D-environment through a window that he can freely position relative to the virtual 3D-environment and at his own discretion. For example, by walking with a handheld autostereoscopic display device, he may choose which part of the virtual 3D-environment he wants to observe. He may walk around a certain virtual scene in the virtual 3D-environment and so observe the virtual scene from a changing perspective (e.g. from different angles). This may advantageously be applied in a game where multiple players see the same virtual environment.

The system of the invention may also be applied in an office environment, where multiple autostereoscopic display devices are placed on a desk or platform. For example, a designer or architect wants to be able to watch his creation in a virtual form in three dimensions. In another example, a student, a worker or a researcher wants to learn more about the 3D-structure of an object, for example a molecular model or a virtual 3D-copy of a technical installation. Although in such applications it may not be a primary aim to continuously move a movable virtual window with respect to the object, it is highly convenient that different autostereoscopic display devices can be positioned at random positions and automatically and instantly provide a view with the correct perspective. This does for example not ask any calibration efforts form the viewer.

Also in the office environment, multiple viewers can be involved in the virtual 3D-environment, for example two designers who work together or a teacher who instructs/teaches a student.

The invention claimed is:

1. An autostereoscopic display system configured to display a single virtual 3D-environment on a plurality of autostereoscopic display devices to one or more viewers, the autostereoscopic display system comprising:

a plurality of autostereoscopic display devices, each autostereoscopic display device comprising a display element for displaying a stereoscopic image to a viewer of the autostereoscopic display device by directing a left eye image and a right eye image to respective eyes of the viewer, each autostereoscopic display device comprising an eye tracker for obtaining a position of the eyes of the viewer relative to the autostereoscopic display device;

a first means for providing a virtual 3D-environment, the virtual 3D-environment comprising at least two virtual windows, each virtual window being defined by a corresponding autostereoscopic display device of the plurality of autostereoscopic display devices, each virtual window allowing a viewer to experience a part of the virtual 3D-environment as displayed on the corresponding autostereoscopic display device, at least one virtual window being a movable virtual window that is movable within the virtual 3D-environment by moving, in the real world, the autostereoscopic display device that defines the movable virtual window;

a second means for obtaining positions of the at least two virtual windows in the virtual 3D-environment;

a third means for determining positions of the eyes of each of the one or more viewers relative to the virtual 3D-environment; and a fourth means for generating a stereoscopic image of the virtual 3D-environment for display on each autostereoscopic display device that is viewed by a particular viewer, the stereoscopic image for each autostereoscopic display device being recorded by a virtual stereo camera that is positioned proximate the determined position of the eyes of the particular viewer of the autostereoscopic display device relative to the virtual 3D-environment, the stereoscopic image for each autostereoscopic display device being capable of being displayed by the display element of the autostereoscopic display device, wherein each of the autostereoscopic display devices defines a virtual window allowing a viewer to experience a part of the virtual 3D environment as displayed on the autostereoscopic display device;

at least one virtual window is a movable virtual window that is movable within the virtual 3D environment by moving, in the real world, the autostereoscopic display device that defines the movable virtual window;

at least one of the viewers experiences the part of the virtual 3D environment through a movable virtual window from a perspective that corresponds to a position of eyes of the at least one of the viewers relative to the virtual 3D environment.

2. The autostereoscopic display system of claim 1, wherein an autostereoscopic display device of the plurality of autostereoscopic display devices includes an accelerometer.

3. The autostereoscopic display system of claim 2, wherein the autostereoscopic display device of the plurality of autostereoscopic display devices further includes a gyroscope.

4. The autostereoscopic display system of claim 2, wherein the autostereoscopic display device of the plurality of autostereoscopic display devices further includes a magnetometer.

5. The autostereoscopic display system of claim 1, wherein the first means comprises a computer-readable medium comprising data that represents the virtual 3D-environment.

6. The autostereoscopic display system of claim 1, wherein the first means comprises a computer program comprising instructions to modify the virtual 3D-environment.

7. The autostereoscopic display system of claim 1, wherein the second means is configured to make use of data representing the position of each autostereoscopic display device of the plurality of autostereoscopic display devices in a real 3D-environment.

8. The autostereoscopic display system of claim 1, wherein the second means is configured to make use of data representing the position of a stationary autostereoscopic display device in a real 3D-environment and data representing the position of one or more movable autostereoscopic display devices relative to the position of the stationary autostereoscopic display device.

9. The autostereoscopic display system of claim 1, wherein:

the third means is configured to make use of the position of the eyes of each viewer relative to the position of an autostereoscopic display device that is viewed by a respective viewer, as obtained by the eye tracker of the autostereoscopic display device that is viewed by the respective viewer; and the third means is configured to make use of the position, as obtained by the second means, of a virtual window in the virtual 3D-environment, the virtual window being defined by the autostereoscopic display device that is viewed by the respective viewer.

10. The autostereoscopic display system of claim 1, wherein the first means comprises means for providing a virtual 3D-environment which comprises at least one virtual window that is not movable within the virtual 3D-environment.

11. The autostereoscopic display system of claim 1, wherein the first means comprises means for providing a virtual 3D-environment wherein all virtual windows are virtual movable windows that are movable within the virtual 3D-environment.

12. The autostereoscopic display system of claim 1, wherein a number of virtual windows that are movable within the virtual 3D-environment is between two and ten, inclusive.

13. The autostereoscopic display system of claim 1, wherein the autostereoscopic display system comprises between two and ten autostereoscopic display devices, inclusive.

14. The autostereoscopic display system of claim 1, wherein the autostereoscopic display system is configured to display a single virtual 3D-environment to between one and ten viewers, inclusive.

15. The autostereoscopic display system of claim 1, wherein the autostereoscopic display devices of the plurality of autostereoscopic display devices are independently of one another selected from a group of: televisions, desktop computer monitors, laptops, mobile phones, tablets and game consoles.

\* \* \* \* \*